Jan. 17, 1967   H. R. BUELL ETAL   3,299,276
TRANSISTORIZED MULTIPLE VOLTAGE REGULATION SYSTEM
Filed Aug. 9, 1963
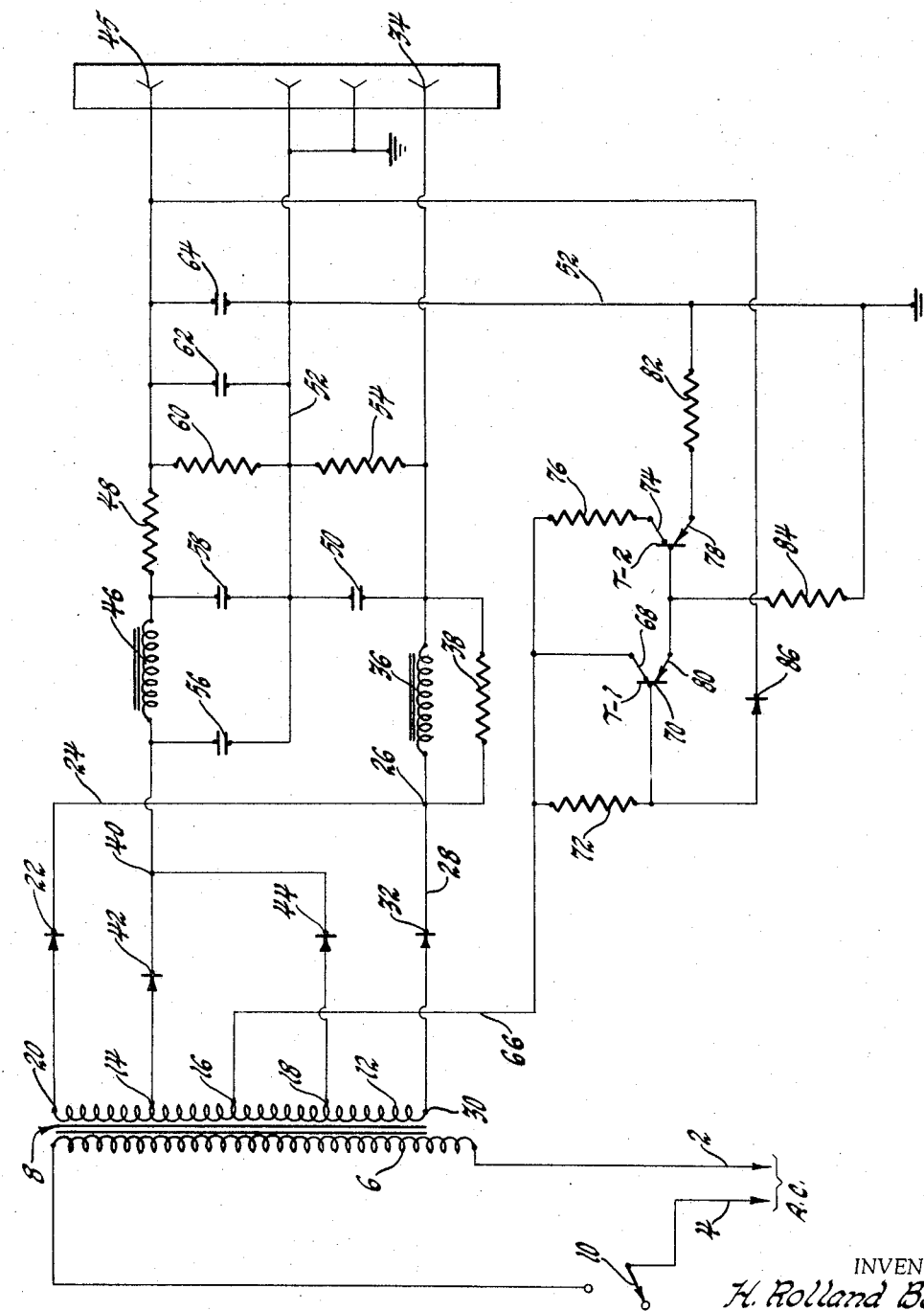
INVENTORS
*H. Rolland Buell &*
BY *Richard L. Jenkins*
*Robert E. Fowler*
ATTORNEY United States Patent Office 3,299,276
Patented Jan. 17, 1967

3,299,276
TRANSISTORIZED MULTIPLE VOLTAGE REGULATION SYSTEM
Harry Rolland Buell and Richard L. Jenkins, Kokomo, Ind., assignors to General Motors Corporation, Detroit, Mich., a corporation of Delaware
Filed Aug. 9, 1963, Ser. No. 301,019
4 Claims. (Cl. 307—34)

This invention relates to electrical power supply means and particularly to voltage regulating means for the same in which a single regulating section controls a plurality of different output voltages.

In complex electrical equipment or in the testing thereof there is need for different supply voltages so a majority of the power supply systems are designed to produce a number of different voltages at given terminals. In most instances these supply voltages should be regulated and kept within the required limits of fluctuation. Some uses do not require any regulation and it may be omitted. However, in those cases where a plurality of different voltages in the supply system require regulation the present invention utilizes one regulatory section for controlling more than one supply voltage and presenting a regulated voltage at each output terminal.

It is, therefore, an object in making this invention to provide a power supply system for producing a plurality of different regulated output voltages, the regulation being provided by a single regulatory section.

It is a further object in making this invention to provide a power supply system for providing a plurality of D.C. voltages of different value from an alternating current source, said different D.C. voltages being regulated by a single regulatory section.

It is a still further object in making this invention to provide an A.C. to D.C. converter producing a plurality of regulated D.C. voltages and having a single regulatory control section in a common ground return lead.

With these and other objects in view which will become apparent as the specification proceeds, our invention will be best understood by reference to the following specification and claims and the illustrations in the accompanying drawings, in which:

The figure is a circuit diagram of a converter for changing alternating current power to multi-potential regulated D.C. power.

Referring now more particularly to the figure, the A.C. power supply is connected to the incoming leads 2 and 4 both of which extend to the terminals of primary winding 6 of power transformer 8. An On-Off switch 10 is inserted in lead 4 to control the application of power from the incoming leads to the primary. The secondary winding 12 of the transformer 8 has a series of taps 14, 16 and 18 intermediate its end terminals for providing a plurality of different output voltages. The upper terminal of the secondary 20 is connected through diode rectifier 22 and conductive line 24 to a common terminal 26 with conductor 28. The lower terminal 30 of the secondary winding is connected through diode rectifier 32 to line 28 and to the same common terminal point. Thus when the whole secondary is utilized the highest output voltage will be obtained and rectified and applied to output terminal 34 through the choke coil 36 and resistor 38 connected in parallel. This circuit acts to smooth and filter the output of the rectifiers.

The next lower voltage is obtained from the two taps 14 and 18 which are commonly connected to terminal 40 through rectifying diodes 42 and 44, respectively. This terminal is connected to the output terminal 45 through an inductance choke coil 46 in series with a resistance 48 acting as a filter. To complete the filter section of the higher voltage output terminal 34 a condenser 50 is connected between the output terminal 34 and the ground line 52 in parallel with a resistance 54. These elements tend to further smooth and filter out ripples in the voltage. Also, resistors 54 and 60 act as bleeder resistors on the power supplies if the power is turned on and back off without any load. Further filtering action is provided for the lower output voltage terminal at 45 by a plurality of condensers 56 and 58 which are connected from opposite ends of the choke coil 46 to the ground line, in addition to which a resistor 60 and two parallel condensers 62 and 64 are connected directly between the output terminal line to 45 and the ground line 52.

The center tap 16 of the secondary winding 12 is connected to ground through voltage regulating means which are the subject matter of the current invention. Tap 16 is, therefore, connected by line 66 directly to the collector 68 of a first transistor T–1, to the base electrode 70 of the same transistor through a resistance 72 and similarly to the collector 74 of transistor T–2 through a resistance 76. Ground line 52 is connected to both emitter 78 of transistor T–2 and emitter 80 of transistor T–1 through resistors 82 and 84, respectively. Diode rectifier 86 of the Zener type is connected across between base electrode 70 and the power supply terminal 45 to regulate this voltage. The normal circuit path for this type rectifier power supply circuit would be from the transformer through the rectifier diodes to the positive voltage terminal which represents a load, through the load to ground and then return through the ground path to the transformer center tap which is normally directly connected to ground. However, in the circuit shown resistance 82, transistor T–2 and resistance 76 are directly connected in such a circuit path between the ground line 52 and the transformer center tap 16.

During operating load conditions load current passes through this circuit just traced with a voltage drop across these three elements in the ground return. When the load is removed and the voltage on terminal 45 rises to the voltage of the Zener diode 86, conductance is permitted through resistance 72 which turns on transistor T–1. This results in the impedance of resistance T–2 being raised until the transformer center tap voltage at 16 goes several volts negative. Thus the voltage appearing at the load terminal 45 does not rise above the Zener voltage of diode 86 even through the voltage from the positive load terminal 45 to the transformer center tap 16 is greater. This is compensated by the center tap going negative. Any other voltage load return through this same transformer center tap circuit, in this case the circuit through terminal 34, will derive similar regulation by the amount that the transformer center tap is driven negative even though this other line does not directly exercise control of the regulatory circuit. The effect is to provide regulation for any other circuit using the center tap ground return path as described and thus in this case both circuits are regulated.

What is claimed is:
1. In power supply means, a source of alternating current power, a transformer having a primary and a secondary winding, said primary winding being connected to the source of alternating current, said secondary winding having end terminals and intermediate taps including a center tap, rectifying means connected to the end terminals and the intermediate taps, a plurality of direct current output lines of different voltage connected to the rectifying means to provide a plurality of different direct current voltages, a resistance-transistor network connected between the center tap of the secondary and ground and acting as a common return lead for the plurality of direct current output lines and a means providing a maximum voltage index level connected between the resistance- transistor network and one of the direct current output lines to determine the bias on the resistance-transistor network and vary it as the voltage on the one direct current output line varies to change the voltage at the center tap to compensate and regulate the direct current voltages.

2. In power supply means, a source of alternating current power, a transformer having a primary and a secondary winding, said primary winding being connected to the source of alternating current, said secondary winding having end terminals and intermediate taps including a center tap, rectifying means connected to the end terminals and the intermediate taps, a plurality of direct current output lines of different voltage connected to the rectifying means to provide a plurality of different direct current voltages, a plurality of transistors connected in parallel between the center tap of the transformer secondary and ground, biasing resistors connected in circuit with said transistors to provide the proper operating voltages and a Zener diode connected between one transistor and one of the direct current output lines to vary the bias thereon as the direct current voltage on that one line changes to in turn vary the voltage at the center tap and regulate the voltages on the direct current output lines.

3. In power supply means, a source of alternating current power, a transformer having a primary and a secondary winding, said primary winding being connected to the source of alternating current, said secondary winding having end terminals and intermediate taps including a center tap, rectifying means connected to the end terminals and the intermediate taps, a plurality of direct current output lines of different voltage connected to the rectifying means to provide a plurality of different direct current voltages, a pair of transistors having base, emitter and collector electrodes, means including resistance means for connecting the collector electrodes of both transistors to the center tap of the secondary winding, second resistance means for connecting the emitter electrodes of both transistors to ground, the emitter of one transistor being connected to the base of the other, third resistance means connecting the remaining base electrode of the one transistor to the center tap to provide the proper operating voltages and a Zener diode connected between the remaining base and one of the direct current output lines to vary the bias on that transistor as the direct current voltage on the line changes to regulate the voltages on the output lines.

4. In power supply means as defined in claim 1 in which the means providing a maximum voltage index level is a Zener diode.

References Cited by the Examiner

UNITED STATES PATENTS

| | | | |
|---|---|---|---|
| 2,434,069 | 1/1948 | Goldberg | 307—12 X |
| 2,967,991 | 1/1961 | Deutch | 323—23 X |
| 2,982,905 | 5/1961 | Lawson | 321—18 |
| 3,090,905 | 5/1963 | Ehret | 307—34 X |
| 3,132,309 | 5/1964 | Constable | 321—27 X |
| 3,205,425 | 9/1965 | Moyer | 321—18 |

ORIS L. RADER, *Primary Examiner.*

T. J. MADDEN, *Assistant Examiner.*